Sept. 10, 1957  R. R. LEWIS  2,806,194
BRIDGE-TRANSITION MOTOR-CONTROL
Filed May 11, 1956  7 Sheets-Sheet 4

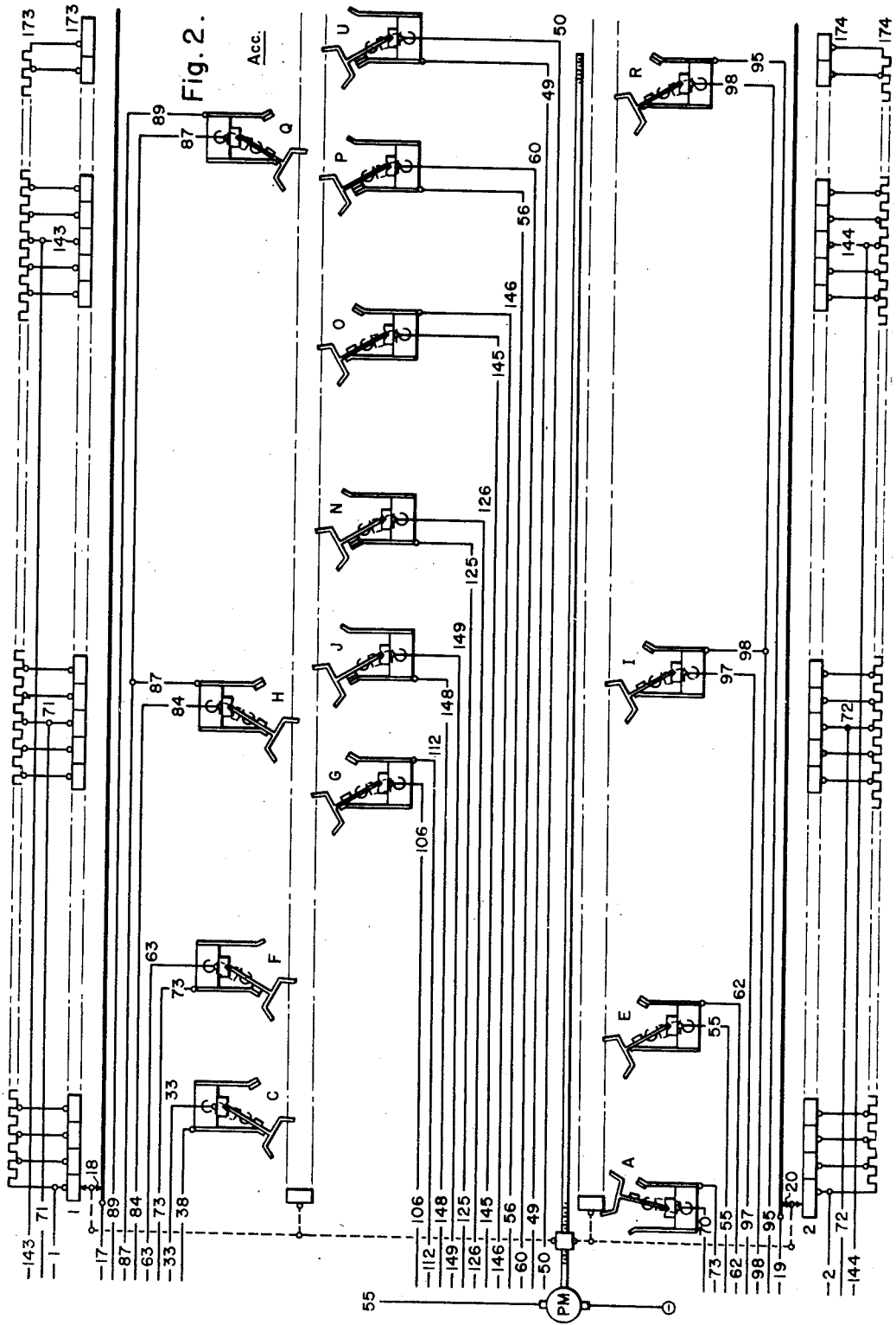

SIMPLIFIED SEQUENCE CHART

| | Fig | LB | G1 | S1 | J' | R11 R22 | M2 M22 | M3 M33 | M1 M11 | B | B1 B2 | Acc. Positions |
|---|---|---|---|---|---|---|---|---|---|---|---|---|
| Series Motoring | 4a | o | o | o | | o | | | | | | 1-65 |
| Full Series | 4b | o | o | | o | o | | | | | | 66-99 |
| Full Series (High Speed) | 4b | o | o | | o | | | | | | | 100-153 |
| Normal Transition (a) | 5a | o | o | | o | o | o | | | | | 66-99 |
| Normal Transition (b) | 5b | o | o | | | o | o | | | | | 66-99 |
| Delayed Transition (a) | 6a | o | o | | o | | o | | | | | 100-153 |
| Delayed Transition (b) | 6b | o | o | | | | o | | | | | 100-153 |
| Delayed Transition (c) | 6c | o | o | | | o | o | | | | | 100-153 |
| Parallel Motoring | 7a | o | o | | | o | o | | | | | 66-132 |
| Parallel Motoring (Pwr.3) | 7b | o | o | | | o | o | | | | | 66-80 |
| Full Parallel | 7c | o | o | | | o | o | o | | | | 133-174 |
| Braking, Coasting | 8a | | | | | o | | | o | | | 174-15 |
| Coasting | 8b | | o | | | | | | | o | o | 14-1 |

Fig. 3.

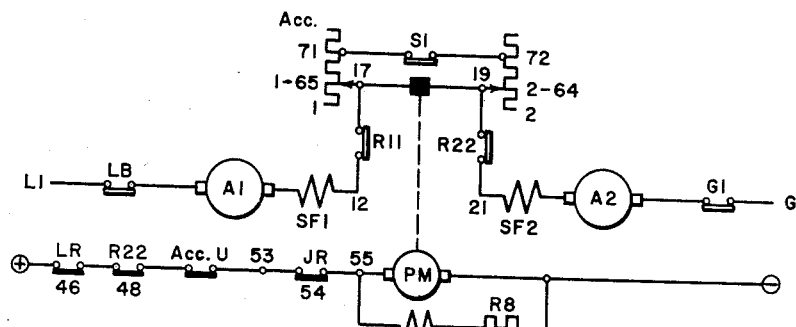

Fig. 4a.—Series Motoring

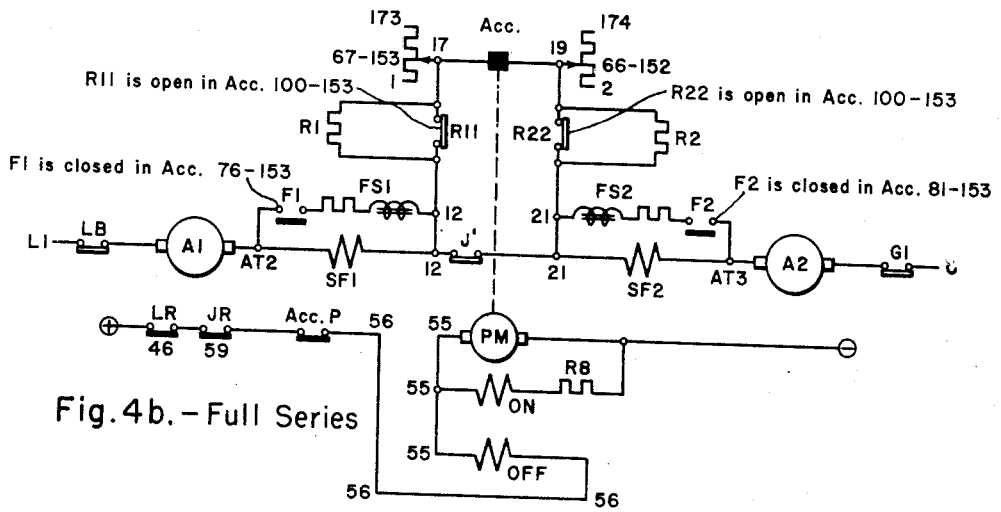

Fig. 4b.—Full Series

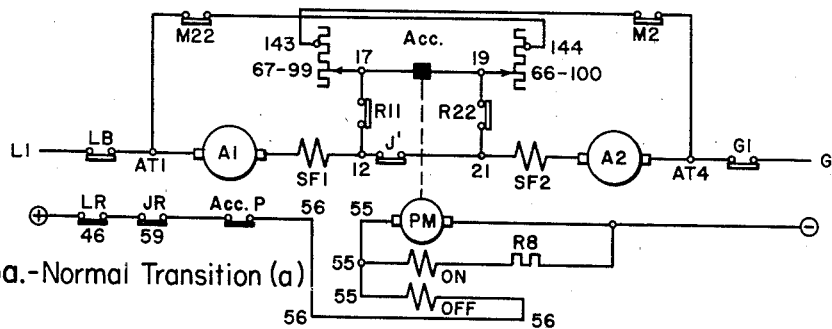
Fig. 5a.-Normal Transition (a)
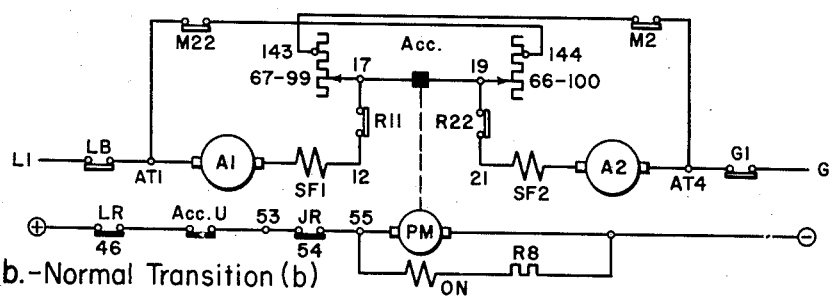
Fig. 5b.-Normal Transition (b)
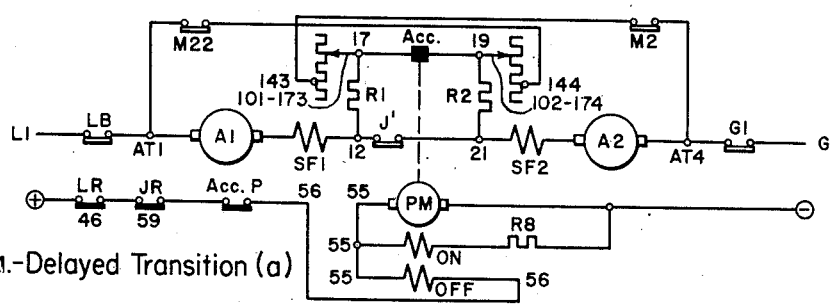
Fig. 6a.-Delayed Transition (a)
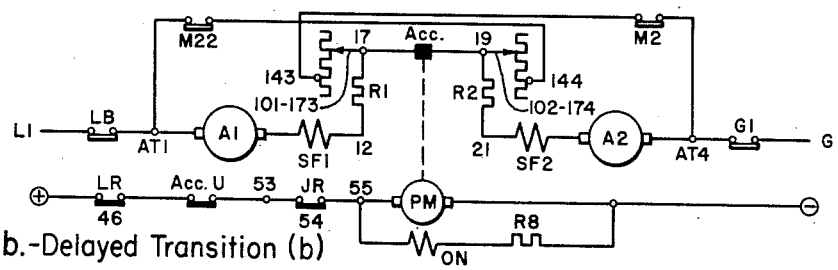
Fig. 6b.-Delayed Transition (b)
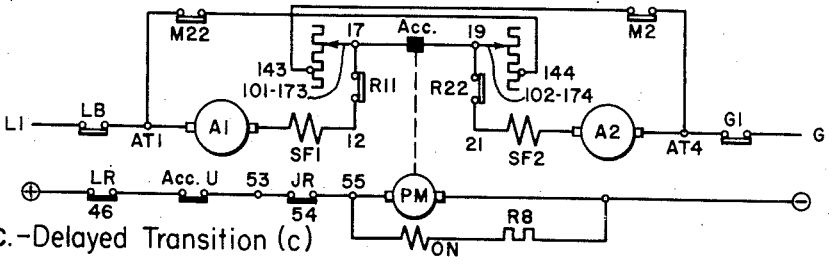
Fig. 6c.-Delayed Transition (c)

Sept. 10, 1957  R. R. LEWIS  2,806,194
BRIDGE-TRANSITION MOTOR-CONTROL
Filed May 11, 1956  7 Sheets-Sheet 6
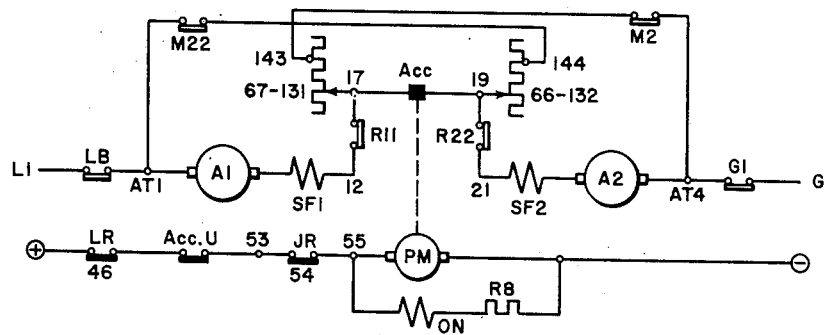
Fig. 7a.—Parallel Motoring
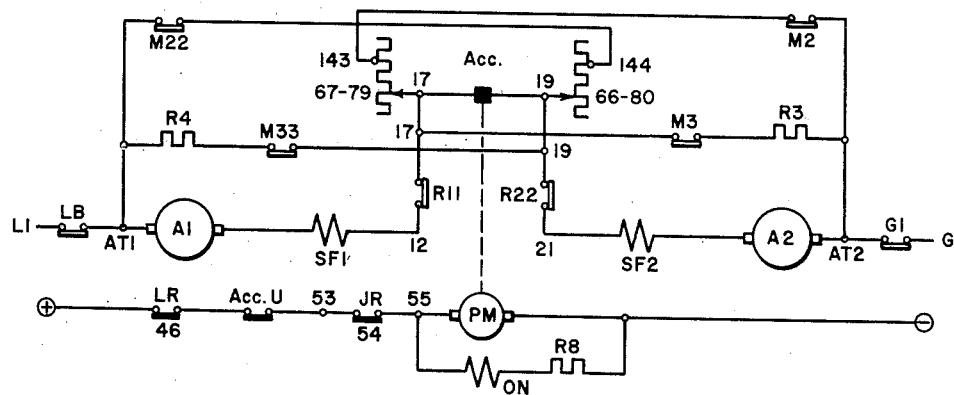
Fig. 7b.—Parallel Motoring (MC on Pwr. 3)
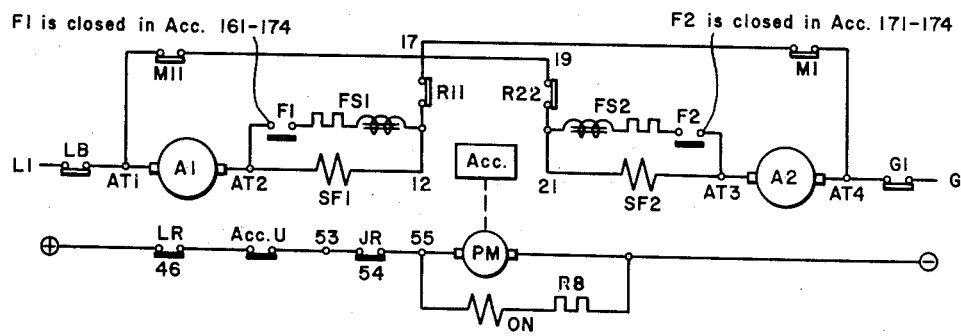
Fig. 7c.—Full Parallel

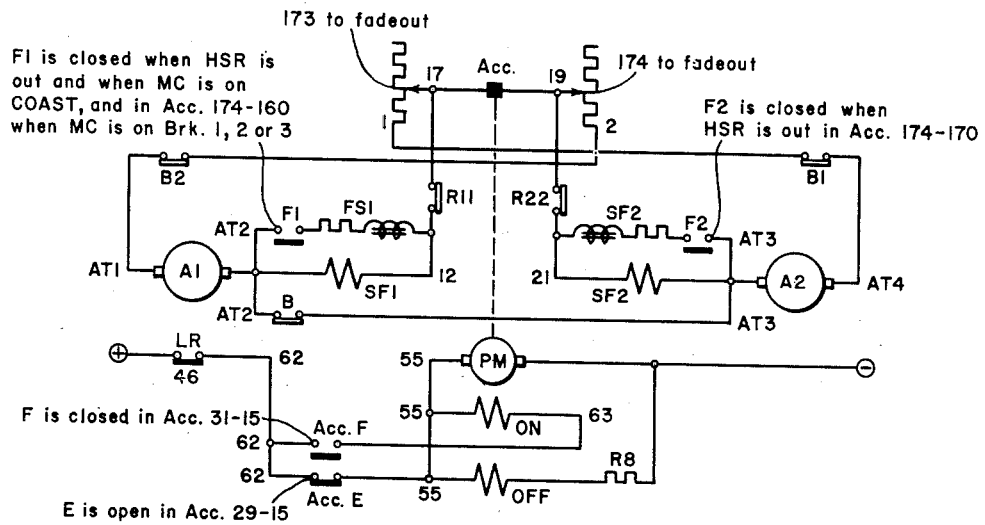
Fig. 8a.-Braking or Coasting
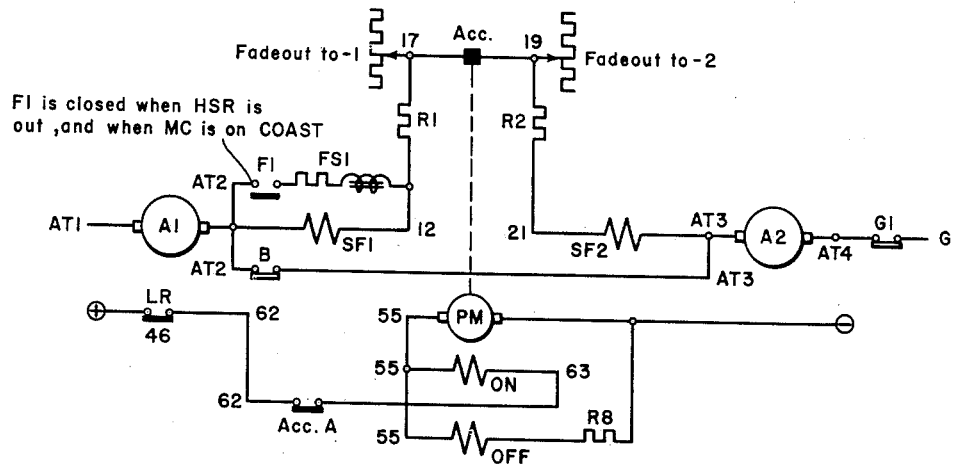
Fig. 8b.-After Fadeout

United States Patent Office 2,806,194
Patented Sept. 10, 1957

2,806,194

BRIDGE-TRANSITION MOTOR-CONTROL

Robert R. Lewis, Braddock Hills, Pa., assignor to Westinghouse Electric Corporation, East Pittsburgh, Pa., a corporation of Pennsylvania Application May 11, 1956, Serial No. 584,280

6 Claims. (Cl. 318—95)

This invention relates to a fast and safe railway-motor control-assembly for using a bridge-type transition from a series motor-combination to a parallel motor-combination, when the resistor-notching device is either a cam-controller, or an accelerator, or other movable plural-contact sequential switching-device which moves in one direction during the power-operation acceleration of the motors, and which moves in the other direction when the power-operation is discontinued. My control is so arranged that the transition may be quickly and safely effected when the sequential switching-device is in any one of a plurality of advanced positions, normally corresponding to parallel-motor-connection operation, and including a switching-position which cuts out substantially all of the accelerating resistors of the motor-control. Such a sequential switching-device is usually power-operated, either by means of an electric pilot-motor drive, or by means of a pneumatic or hydraulic fluid-actuated operating-means.

My invention makes it possible for the operator to turn the power off, while the motors are operating at an advanced speed, and to immediately reapply the power in a series motor-connection, followed by a bridge-type transition to a parallel motor-connection, without suffering the time-delay of two seconds, or the like, which would be required if the sequential switching-device were first restored to its initial starting-position, and yet without the risk of a momentary short-circuit across the power-line during the bridge-transition if the sequential switching-device should be in a position in which the accelerating resistance is substantially all cut out at the moment of transition. My invention is particularly useful in railway-motor control-assemblies in which provision is made for dynamic braking, in which case it is necessary to permit the resistance-controlling switching-device to range forward, during power-operation, under the control of a limit-relay means, so that the accelerating and braking resistors are constantly maintained, not only in a desired condition for power-operation, but also in a proper condition in readiness for dynamic braking, at all motor-speeds during the power-operation of the motors.

It is also desirable to provide for the coasting operation of the motors, with power off, at high motor-speeds, with dynamic-braking connections established, but with the proper amount of braking-resistance in a circuit so that, as long as dynamic braking is not called for by the master-controller, the amount of dynamic braking under these coasting conditions will be small, but so that, the moment dynamic braking should be called for, the amount of braking resistance which is then in circuit will be suitable to permit a quick change to the desired dynamic-braking conditions. To this end, it is desirable to have the resistance-controlling switching-device range slowly backwardly, during the motor-coasting operation, under the control of a limit-relay means which is properly set to have a low pickup-setting which is commensurate with the small braking-currents which are desired under these coasting conditions.

In brief, my invention makes it possible to keep the sequential resistance-switching device always set at a proper position in readiness for dynamic braking, at all motor-speeds above brake-fadeout, and yet to permit the safe transition from series to parallel motor-combination operation, regardless of the position of the resistance-switching device, and also to permit the immediate establishment of any desired amount of dynamic braking, without having first to wait, even for two seconds, while the sequential switching-device is rapidly being run into some position other than the position which it was occupying at the moment.

I accomplish these purposes by the use of a transition-resistor means, usually in the form of two transition-resistors, suitably connected, and suitably controlled, whereby these transition-resistors are in circuit during the momentary across-the-line transitional connection which is made during the bridge-transition, so that the resistance of these transition-resistors will prevent a line-short-circuit, even though substantially all of the accelerating resistances should be shorted out at the moment. If these transition-resistors are so connected that they carry the heavy line-shorting currents for only the brief time necessary for getting the transitional connection opened, during the bridge-transition, as can readily be arranged, the kilowatt-second rating of these transition-resistors can be very small, so that the cost and space requirements of these transition-resistors will be very small; or the transition-resistors may be made, by suitable connections, to do double service, at other times, in some other function of the motor-control, such as starting-resistors, so that no additional resistance is needed for the transition-control.

An exemplary form of embodiment of my invention is shown in the accompanying drawings, wherein:

Fig. 2 is a diagrammatic development of the motor-operated accelerator which is used in the form of embodiment which has been chosen for illustration in Figs. 1a and 1b;

Fig. 3 is a simplified sequence chart; and

Figs. 4a to 8b are simplified diagrams of the principal connections during different motor-operating conditions.

Figure 1A:
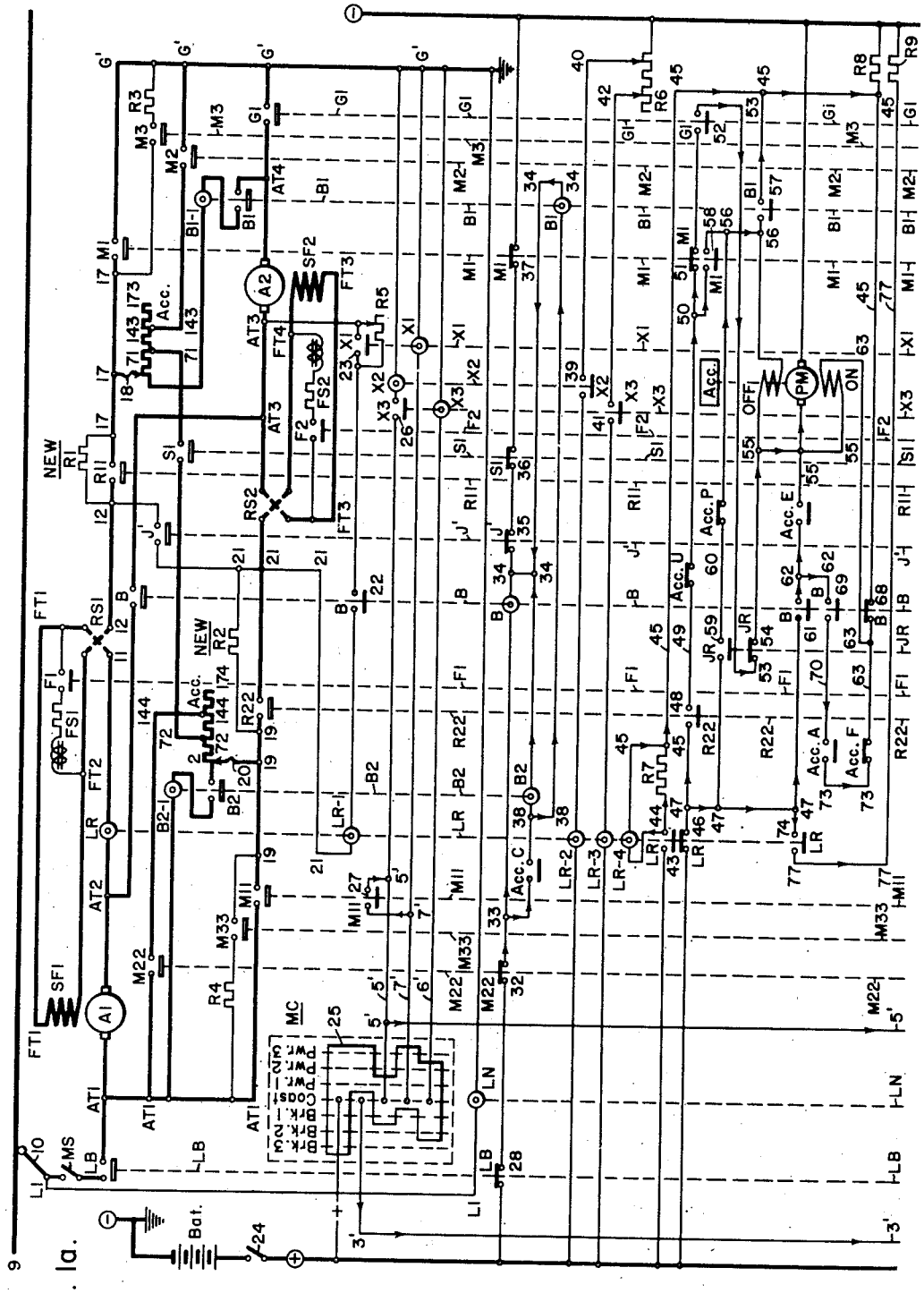
Figures 1a and 1b are a simplified circuit-diagram of those parts of one car, locomotive, or other vehicle, which are necessary to illustrate my present invention, omitting many parts which are known to be needed in a successful railway-control equipment, but which are not necessary to be discussed in setting forth the nature and operation of my present improvement.
Figure 1B:
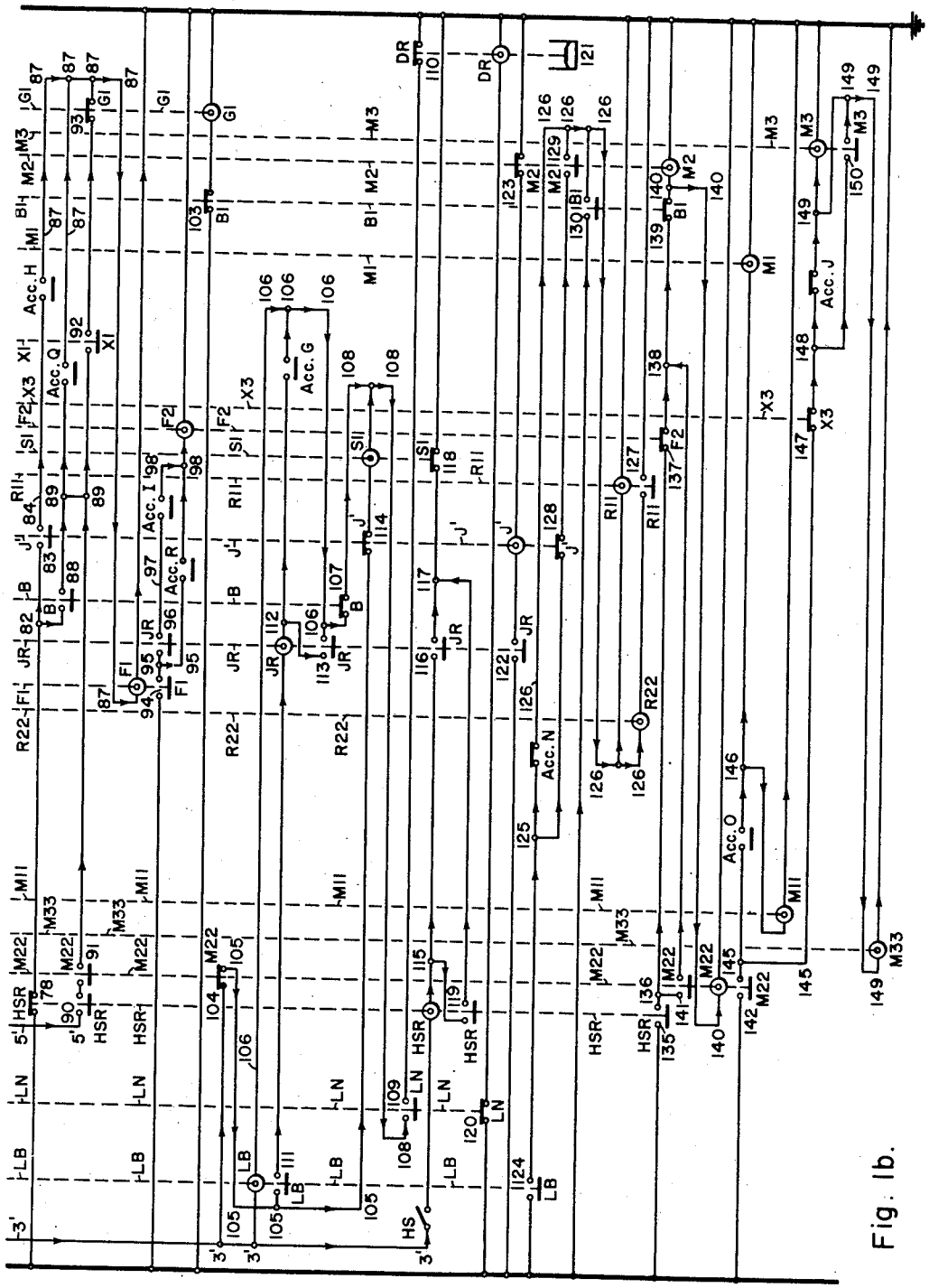

In the form of my invention which is shown in Figs. 1a and 1b, direct-current power is supplied to the vehicle from a third rail 9, or a trolley wire, which is engaged by a third-rail shoe 10, or a trolley pole, pantograph, or other current-collecting equipment, carried by the vehicle. The third-rail shoe 10 energizes a line L1 which constitutes a supply-circuit for the vehicle. The traction-motors for the vehicle are illustrated as being series motors, which are arranged as two motor-means, each motor-means comprising either one or a plurality of motors which are permanently connected together and switched as if they were a single motor. For simplicity of illustration, the traction-motors are shown as comprising two motor-armatures A1 and A2, each being associated with its own series field winding SF1 or SF2, through a reversing-switch RS1 or RS2, respectively. Two motor-means, or circuits, are shown.

The first motor-means comprises, in series, an armature-terminal AT1, a motor-armature or armatures A1, a second armature-terminal AT2, a series operating-coil LR of a limit-relay LR, a circuit 11, the reversing-switch RS1, and a conductor 12 which constitutes the second terminal of the first motor-means. The reversing switch RS1 is connected to the field-terminals FT1 and FT2 of the series-field winding or windings SF1, for supplying the field-excitation for said armature or armatures A1. The motor terminal AT1 is energized, by means of a main switch MS and a line-switch or contactor LB, from the supply-circuit L1. The motor-terminal 12 is connected, in accordance with my present invention, through a transition-resistor R1 which I also use as a starting-resistor, and thence to a circuit 17 which is connected to a movable tap 18 of an eccelerator-resistance 1–173. The circuit 17 is connected, through a parallel-motor-combination switch M1, to a ground-circuit G' which constitutes the second power-supply terminal for the two motor-means.

The first motor-terminal AT1 is connected down to a parallel-motor-combination switch M11 which energizes a conductor 19 which is also connected to a movable tap 20 of an accelerator-resistance 2–174. The circuit 19 is also connected, in accordance with my invention, through a second starting-and-transition resistor R2, to a circuit 21, which constitutes a terminal of the second motor-means. This second motor-means can be traced, from the circuit 21, through a reversing switch RS2 to an armature-terminal AT3, and thence through an armature or armatures A2 to an armature-terminal AT4 which constitutes the second terminal of the second motor-means. This armature-terminal AT4 is connected to the ground conductor G' through a ground-switch G1. The reversing switch RS2 of the second motor-means is connected to the field-terminals FT3 and FT4 of a series field-winding or windings SF2 of the second motor-means.

The first-mentioned parallel-motor-combination switch M1 is in parallel-circuit relation to a circuit including a switch M3 and a resistor R3, connected between the circuits 17 and G'. In like manner, the second-mentioned parallel-motor-combination switch M11 is paralleled by a circuit containing a switch M33 and a resistor R4, connected between the conductors AT1 and 19.

The last of the main circuits of the traction-motors may be briefly described as follows. The armature-terminals AT2 and AT3 are connected by a braking-circuit switch B. The initial terminal 1 of the accelerator-resistance 1–173 is connected, by a braking-circuit switch B1 and a braking-switch series hold-in coil B1–1, to the armature-terminal AT4. The initial terminal 2 of the second accelerator-resistance 2–174 is connected, by a braking-circuit switch B2 and a braking-switch series hold-in coil B2–1, to the armature-terminal AT1. A first intermediate point 71 in the first accelerator-resistance 1–173 is connected to a corresponding intermediate point 72 of the second accelerator-resistance 2–174 through an initial series-motor-combination switch S1. A second intermediate point 143 of the first accelerator-resistance 1–173 is connected to the ground conductor G' through an initial parallel-motor-combination switch M2. A correspondingly located second intermediate point 144 of the second accelerator-resistance 2–174 is connected to the first armature-terminal AT1 through a second initial parallel-motor-combination switch M22. The two intermediate terminals 12 and 21 of the two motor-means or circuits are connected to each other through a final series-motor-combination switch J'. The two transition-resistors R1 and R2 are bypassed by means of bypassing switches R11 and R22, respectively.

The two accelerator-resistances 1–173 and 2–174 are parts of an accelerator marked Acc., which is diagrammatically indicated in Fig. 2. This accelerator is moved, in both an advancing direction and a retracting direction, by means of a pilot motor PM, so as to simultaneously adjust the positions of the two taps 18 and 20 of the respective resistances 1–173 and 2–174, and also to actuate a plurality of toggle-switches A to U which are disposed at various points along the line of movement of the accelerator, in a manner which will be subsequently described.

The accelerator-positions between which the several accelerator switches A to U are opened or closed will be evident from Fig. 2, and are also tabulated in the following Table I, Sequence of Accelerator Interlock Operations, which also indicates the wire-numbers between which the different switches or interlocks are connected, as will be subsequently described.

*Table I.—Sequence of accelerator interlock operations*

Wires 70—73, A is closed from 2 to 174 and from 174 to 2
Wires 33—38, C is closed from 16 to 174 and from 174 to 15
Wires 55—62, E is closed from 31 to 174 and from 174 to 30
Wires 63—73, F is closed from 1 to 32 and from 31 to 1
Wires 106—112, G is closed from 66 to 174 and from 174 to 65
Wires 84—87, H is closed from 76 to 174 and from 174 to 75
Wires 97—98, I is closed from 81 to 174 and from 174 to 80
Wires 148—149, J is closed from 1 to 80 and from 79 to 1
Wires 125—126, N is closed from 1 to 100 and from 99 to 1
Wires 145—146, O is closed from 133 to 174 and from 174 to 132
Wires 56—60, P is closed from 1 to 153 and from 152 to 1
Wires 87—89, Q is closed from 161 to 174 and from 174 to 160
Wires 95—98, R is closed from 171 to 174 and from 174 to 170
Wires 49—50, U is closed from 1 to 172 and from 172 to 1

In the usual railway-motor control-schemes, the motor-fields SF1 and SF2 are equipped with several stages of field-shunting means, which are represented, in my Figs. 1a and 1b, by a single field-shunting stage indicated by field-shunts FS1 and FS2, which are connected across the respective series fields SF1 and SF2 by means of field-switches F1 and F2, respectively.

All of the electrically controlled relays and switches which are shown in the drawing are diagrammatically indicated as having vertical switch-stems (indicated by dotted lines), which are biased by gravity toward their lowermost positions, and all of these switches and relays are shown in their non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

The first control-circuit which follows the main motor-circuits is a circuit which is connected to the conductor 21 and which is used to energize a shunt-energized limit-relay rerating-coil LR–1 in series with a braking-switch make-contact 22, or B-in interlock, and an adjustable resistance R5 which is bypassed by a make-contact 23 of an auxiliary switch X1. The energizing-circuit of the shunt-energized limit-relay rerating-coil LR–1 is completed by being connected to the armature-terminal AT3, so that said shunt coil LR–1 is energized in shunt across the terminals of the series field-winding or windings SF2 of the second motor-means, thus being responsive not only to the motor-current but also to the rate of change of the motor-current. The shunt-connected limit-relay rerating-coil LR–1 is used to rerate the limit-relay LR, or to change its setting, whenever the braking-circuit switch B is closed; this rerating coil LR–1 being particularly effective during spotting.

With a single exception, all of the remaining control-circuits of Figs. 1a and 1b are shown as being energized across positive and negative buses (+) and (—). The positive bus (+) is energized through a switch 24 from a battery Bat., the negative terminal (—) of which is illustrated, for simplicity, as being grounded, although, in practice, a more complicated intermediate-point grounding-circuit may be used.

The first control-circuits which are energized from the positive and negative buses (+) and (—) are associated with a master controller MC, which is diagrammatically indicated, in its simplest form, as being a multiposition drum-type controller having a cylindrical rotatable contact-member 25, which makes contacts with five stationary contacts which are connected respectively to the positive bus (+), a wire 3′, a wire 5′, a wire 7′, and a wire 6′. The illustrated master controller MC has a normally occupied central position, marked "Coast," which is a power-off position, having on one side of it three power-on positions marked Pwr.1 Pwr. 2 and Pwr. 3, and having on the other side three dynamic-braking positions marked Brk. 1, Brk. 2 and Brk. 3.

The line 5′ is connected to a make-contact 26 of an auxiliary relay X3, the operating coil X2 of an auxiliary relay X2, and thence to the grounded wire G′, and thence back to the grounded negative battery-terminal (—). The wires 5′ and 7′ are also connected to each other by means of a make-contact 27 of the parallel-motor-combination switch M11. The wire 7′ energizes the operating coil X1 of the auxiliary relay X1 from the negative conductor G′. The last wire 6′ of the master controller MC energizes the operating coil X3 of the auxiliary relay X3, from the aforesaid grounded conductor G′.

The next control-circuit which is shown in Figs. 1a and 1b, below the wire 6′, is a control-circuit which connects the operating coil LN of a line relay LN between the supply-circuit L1 and the grounded circuit G′ of the supply-line for the two traction-motor means.

The positive bus (+) is next connected to a back-contact or break-contact 28 of the line-switch LB, which serves as an LB-out interlock, and thence to a back-contact 32 of the parallel-motor-combination switch M22, and thence to a conductor 33. The circuit of the conductor 33 extends on to the operating coil B of the braking-circuit switch B, and thence to a conductor 34, then to a back-contact 35 of the final series-motor-combination switch J′, then to a back-contact 36 of the initial series-motor-combination switch S1, and finally to a back-contact 37 of the parallel-motor-combination switch M1, the circuit being completed at the negative bus (—). The conductor 33 is also connected to the accelerator switch Acc. C, which energizes a circuit 38 when the accelerator reaches its position 16. Between the circuits 38 and 34 are connected the operating coils B1 and B2 of the two braking-circuit switches B1 and B2, so that these two coils are energized in parallel with the braking-switch coil B whenever the accelerator contact Acc. C is closed.

The positive battery terminal (+) is next connected to a rerating coil LR–2 of the limit relay LR, which is connected through a make-contact 39 of the auxiliary relay X2 to a first variable tap 40 on a resistance R6 which is connected to the negative bus (—). Next, the positive bus (+) is connected to another rerating coil LR–3 of the limit relay LR, the circuit of which is completed through a make-contact 41 of the auxiliary relay X3, and a second tap 42 on the resistor R6.

The positive bus (+) is next connected to a make-contact 43 of the limit relay LR, and thence to a circuit 44, a resistor R7, a circuit 45, a resistor R8, and finally to negative bus (—). Connected in parallel to the terminals 44 and 45 of the resistor R7, there is another rerating coil LR–4 of the limit relay LR, so that the rating of said limit relay is changed according to whether the limit-relay contact 43 is opened or closed, and also according to the voltage-drop which is consumed in the resistor R8, as a result of the excitation of the pilot-motor field-coils Off and On, which will be subsequently described.

The next control-circuit extends from the positive bus (+) to a back-contact 46 of the limit relay LR, thence to a conductor 47, a make-contact 48 of the transient-resistor bypassing switch or contactor R22, a circuit 49, and the accelerator limit switch Acc. U; thence to a conductor 50, and to a back-contact 51 of the parallel-motor-combination switch M1, then to a make-contact 52 of the ground-switch G1, and to a conductor 53, then to a back-contact 54 of an auxiliary control-circuit relay JR for controlling the series motor-connection. After the JR contact 54, which serves as a JR-out interlock, the circuit continues through a conductor 55, and the "off" or retracting field-coil Off of the pilot motor PM, thence to a conductor 56, and finally through a make-contact 57 of the braking-connection switch B1 to the previously mentioned conductor 45. Another circuit is provided for energizing the conductor 56 directly from the conductor 50, through a make-contact 58 of the parallel-motor-combination switch M1. Still another circuit is provided for energizing this same conductor 56 in a circuit which starts with the conductor 47, and extends through a make-contact 59 of the auxiliary relay JR, thence to a conductor 60 and the interlocking accelerator-switch Acc. P, and to the aforesaid circuit 56.

The conductor 47 also extends down to a circuit containing a make-contact or B-in interlock 61 of the braking-connection switch B, and thence to a conductor 62 which is connected to the accelerator switch Acc. E, and thence to the previously mentioned conductor 55. This conductor 55, in addition to energizing the retracting field-coil Off, is also used to energize one terminal of the armature circuit of the pilot motor PM, the other terminal of which is connected directly to the negative bus (—). This same circuit 55 is also connected to one terminal of an on-movement or advancing field-coil On of the pilot motor PM, the other terminal of this field-coil On being connected to a conductor 63, which extends to a back-contact 68 of the braking-switch B, and thence to the previously mentioned conductor 45. A connecting-circuit is also provided between the conductors 62 and 63, which may be traced from the conductor 62, through a B-in interlock 69, a conductor 70, the accelerator switch Acc. A, a conductor 73, the accelerator switch Acc. F, and thence to the conductor 63.

The previously mentioned circuit 47 is also connected, through an LR-in interlock 74 to a conductor 77, which is connected through a resistor R9 to the negative bus (—).

The positive battery terminal (+) is next connected, through a back-contact 78 of a high-speed relay HSR, to a circuit 82, which extends on, through a J′-in interlock 83, a conductor 84, the accelerator switch Acc. H, a condutor 87, and the operating coil F1 of the field relay F1, and thence to the negative bus (—). The conductor 82 is also connected through a B-in interlock 88, a conductor 89, and the accelerator switch Acc. Q to the conductor 87.

The control-wire 5′, which comes from the master controller MC, is also connected through an HSR-in interlock 90 and an M22-in interlock 91 to the previously mentioned conductor 89. There is also a connection from this conductor 89, on through an X1-in interlock 92 and a G1-out interlock 93, to the previously mentioned conductor 87.

The positive bus (+) is also connected through an F1-in interlock 94 to a conductor 95, and thence through a JR-in interlock 96 to a conductor 97, the accelerator switch Acc. I, a conductor 98, and thence through the operating coil F2 of the field relay F2 to the negative bus (—). The circuit 95 is also connected to the circuit 98 through the accelerator switch Acc. R.

The next control-circuit from the positive bus (+) includes a B1-out interlock 103, and the operating coil G1 of the ground switch G1.

Continuing on down the control-circuit diagram in Figs. 1a and 1b, it will be noted that the wire 3' of the master controller MC is used, first, to make a connection through an M22-out interlock 104 to a wire 105, which will be referred to a little later on. The master-controller wire 3' is also connected, in another circuit, through the operating coil LB of the line switch LB, thence to a conductor 106, thence to a B-out interlock 107, a conductor 108, and an LN-in interlock 109, to a break-contact 110 of a time-delay relay DR, and thence to the negative bus (−).

Turning back to the wire 105, it will be noted that there is a connection from this wire through an LB-in interlock 111 and the auxiliary-relay energizing-coil JR, to a circuit 112 and the accelerator switch Acc. G, and thence to the previously mentioned conductor 106. This accelerator switch Acc. G is also bypassed by means of a JR-in interlock 113.

There is another, final circuit-extension from the wire 105 to a J'-out interlock 114, and thence to the S1 coil, and thence to the previously mentioned conductor 108.

Referring back to the master-controller wire 3', there is a final circuit-extension from this wire to a high-speed selective switch HS, which is usually placed in juxtaposition to the master controller MC, or at least within the easy reach of the operator who is stationed at the master controller, so that he can close this high-speed switch HS when he desires to obtain high-speed operation of the traction-motors. From this high-speed switch HS, the circuit extends to the operating coil HSR of the high-speed relay HSR, and thence to a conductor 115, a JR-in interlock 116, a conductor 117, and an S1-out interlock 118, to the negative bus (−). The JR-in interlock 116 is also bypassed by an HSR-in interlock 119.

The next control-circuit from the positive bus (+) contains a back-contact 120 of the line relay LN, which is used to energize the operating coil DR of the time-delay relay DR. This time-delay relay DR is provided with a time-delay means, represented by a dashpot 121, for delaying the dropping out of this relay after its energization as a result of the dropping out of the line relay LN when the vehicle passes over a gap in the third rail, or when the power is momentarily lost for any reason. The DR relay thereupon opens its back-contact 110, and keeps it open for a sufficient length of time to make sure that the line switch LB has had time to drop out, and also to drop out a number of other interlocked switches, including the field-shunting switches F1 and F2, so as to make sure that the equipment is in a suitable condition for a reapplication of power, before the line switch LB can be again energized. This time-delay relay DR is known in the art.

The positive bus (+) is next connected to a JR-in interlock 122, which energizes the operating coil J' of the final series-motor-combination switch J' in series with an M2-out interlock 123.

Next, the positive bus (+) is connected to an LB-in interlock 124 and thence to a conductor 125, then to the accelerator interlock-switch Acc. N and to a conductor 126 which energizes the operating coil R11 of the transition-resistor bypassing-switch R11. This conductor 126 also energizes the operating coil R22 of the other transition-relay bypassing-switch R22, in series with an R11-in interlock 127.

The positive bus (+) is also connected to an HSR-in interlock 135, which is connected to a circuit 136, and thence to an F2-out interlock 137, a circuit 138, and a B1-out interlock 139, which energizes a circuit 140 which energizes the operating coils M2 and M22 of the initial parallel-motor-combination switches M2 and M22. The F2-out interlock 137 is bypassed by an M22-in interlock 141.

And finally the positive bus (+) energizes a circuit which contains an M22-in interlock 142, a conductor 145, the accelerator switch Acc. O, and a conductor 146, which energizes the operating coils M1 and M11 of the final or full-parallel motor-combination switches M1 and M11. The conductor 145 also energizes a second circuit containing an X3-out interlock 147, a conductor 148, the accelerator switch Acc. J, and a conductor 149, which energizes the operating coils M3 and M33 of the other two parallel-motor-combination switches M3 and M33. The accelerator switch Acc. J is bypassed by the M3-in interlock 150.

The general principle of operation of the series-parallel motor-control which is illustrated in the drawings will be obvious to the skilled workers because of the many points of similarity to previously known systems of this type. The traction motors, during their acceleration in power-operation, progress through a series motor-combination to a parallel motor-combination, which is usually concluded with one or more field-shunting steps.

The distinctive feature of my invention is that the accelerating resistors which are used during the acceleration of the motor are cut out by a movable, motor-energized, sequential multiposition switching-means or device (using any sort of motive power), which moves in an advancing direction throughout the entire power-operation acceleration of the motors, and which does not have to be retracted to its initial position before a second transition from series to parallel-motoring is permitted, in case the power should be shut off while the motors are operating at an advanced speed. Specifically, my invention puts both the advancement and the retraction of the accelerator Acc. or other plural-contact switching-device under the control of the limit-relay LR, the calibration of which is readjusted many times in accordance with the various operating-conditions of the equipment, by any known or desirable rerating means such as that which is illustrated in the accompanying drawings.

The accelerator Acc. or other movable switching-device is advanced only when the master controller MC is in one of its power-on positions such as the positions Pwr. 1 to Pwr. 3. Preferably, this switching-device controls not only the two groups of accelerating resistors, but also the braking-circuit resistors, which may be either grouped with the accelerating resistors (as shown), or disposed in a third braking-resistor group, as is known in the art. The point is, that after the accelerating parts of the resistor-assembly have all been cut out, as by means of the closure of either the final series-motor-combination switch J' or the final parallel-motor-combination switches M1 and M11, the accelerator continues to range forward, under the control of the limit-relay, to adjust the values of resistances, even after they are cut out of, or bypassed from, the motoring-circuit, so that the approximately correct values of resistances will be ready, at every instant, in case the master controller should be moved to its off-position Coast or to one of its braking positions Brk. 1 to Brk. 3.

In some control-systems, this forward-ranging accelerator-position control is used only after the establishment of the full-parallel motoring-conditions, and not after the establishment of the full-series motoring-conditions, depending upon whether transition from series to parallel-motoring is accomplished immediately and automatically after the establishment of the full-series motor-connections, or whether the control is arranged (as shown) to permit the motors to remain in their series-motor-combination until the operator decides to provide for a parallel-motoring operation.

In practicing my invention, the advancing movement of the accelerator or other switching-device is made only during one of the power-on positions of the master controller, and the retracting movement is made only during a power-off position such as the coasting and braking positions of the master controller. When the power-operation of the motors is discontinued, the accelerator is not suddenly advanced to full-on position, nor is it suddenly retracted to full-off position, but its advance is continued only as long as the power is on, and its retraction is continued only as long as the power is off, both of these movements of the accelerator or other switching-device being permitted only when the motor-current is less than the pickup-value or setting of the limit relay LR, this setting being automatically adjusted, at all times, in accordance with the desired minimum motor-current to be maintained.

I accomplish my aim of permitting a series-to-parallel motor-connection bridge-transition at any position of the accelerator Acc. or its equivalent, by the use and the placement, in the circuit, of the transition-resistors R1 and R2, with their suitable control. In the illustrated control-system, these transition-resistors have to carry current, particularly a heavy current, for only a very few seconds, so that their kilowatt-second rating is quite small, which is a desirable feature.

The principal switch-sequences are tabulated in Fig. 3, and the principal connections, for the various conditions, are shown in Figs. 4a to 8b, which will now be briefly explained.

The initial stages of the series motoring operation are shown in Fig. 4a. The master controller MC is on any one of its three power-on positions Pwr. 1 to Pwr. 3, but the high-speed switch HS is open, so that the control cannot advance beyond the series-motor-connection. The particular power-on position of the master controller controls the rate of acceleration of the motors, through the controller-wires 5' and 6' of Figs. 1a and 1b, which control the X2 and X3 interlocks 39 and 41 in series with the rerating coils LR-2 and LR-3 of the limit-relay LR. Among the switches which are initially closed upon the energization of the master-controller wire 3', is the initial series-motor-combination switch S1, which establishes a series motor connection between the fixed points 71 and 72 of the accelerator, thus including, in the series-motor circuit, the resistance-portion between the movable-tap circuit 17 and the fixed tap 71, and also the resistance-portion between the fixed tap 72 and the movable-tap circuit 19, as shown in Fig. 4a.

The actuation of the series-motoring switch S1 opens the S1-out interlock 36 (Fig. 1a), which deenergizes the braking-circuit switch B, causing the latter to close its B-out interlock 107, so as to energize the line-switch LB, thus establishing the series motoring circuit. The line-switch interlock LB-in, marked 124, immediately energizing the starting-resistor bypassing-switches R11 and R22, which cut the starting-and-transition resistors R1 and R2 out of the motor-circuits. The accelerator Acc. starts advancing as soon as the starting-resistor switch R22 is closed, as shown by the connections of the pilot motor PM in Fig. 4a; and the accelerator continues to advance through positions 1 to 65, under the control of the limit-relay contact 46, during this stage of the operation.

When the accelerator Acc. advances as far as position 66, the interlocking switch Acc. G closes, in the control-circuit which contains the LB-in interlock 111 and the JR coil in Fig. 1b, thus picking up the final series-motor-combination switch J', to bypass the accelerator resistances 1–173 and 2–174, to establish the full-series motor-ing-connection which is shown in Fig. 4b. As soon as the full-series switch J' closes, the accelerator-resistances 1–173 and 2–174 are effectively out of the motor-circuit, and the initial series-motoring switch S1 is deenergized by the J'-out interlock 114 of Fig. 1b. The pilot-motor continues to be energized, under the control, of course, of the limit-relay contact 46, with the connections shown in Fig. 4b, while the accelerator continues to advance between the positions 66 and 153, at which point the accelerator interlock Acc. P opens and discontinues further accelerator-advance during this series motor connection, thereby adjusting the positions of the resistance-taps 17 and 19 in substantial readiness for dynamic braking, according to the motor-speed, which affects the motor-current, which actuates the limit-relay contact 46 in the pilot-motor circuit. This motor-resistance setting, in the accelerator-positions 66 to 153, is of course immaterial to the series-motor connections, because the resistances are short-circuited or bypassed by the full-series switch J'.

In the particular motor-control scheme which is shown in Figs. 1a, 1b and 4b, provision is made for shunted-field operation in the series motor connection, as indicated in Fig. 4b by the legends, which show that the first field switch F1 is closed (by the acclerator switch Acc. H in the circuit 84 of Fig. 1b) when the accelerator reaches position 76, while the other field switch F2 is closed (by the accelerator switch Acc. I in the circuit 97 of Fig. 1b) when the accelerator reaches position 81.

In accordance with my invention, the two transition-resistors R1 and R2 are placed in series with the respective bypassed accelerating resistors 1–173 and 2–174 of Fig. 4b; the first transition-resistor R1 being in the circuit between the motor-terminal 12 and the movable resistance-tap 17; and the second transition-resistor R2 being in the circuit between the motor-terminal 21 and the movable resistance-tap 19; while the resistance-bypassing switch J' is connected between the two motor-terminals 12 and 21. In most of the connections of the motors, these two transition-resistors R1 and R2 are shorted or bypassed by their respective bypassing-switches R11 and R22, as shown in Fig. 4b. At some suitable time after the closure of the full-series switch J' at the accelerator-position 66 (as will be more fully discussed hereinafter), the transition-resistor bypassing-switches R11 and R22 are opened, thereby inserting the transition resistors R1 and R2 in a circuit-portion which is carrying no current at the time. In the particular embodiment of my invention which is shown in Figs. 1a, 1b and 4b, these transition-resistor bypassing-switches R11 and R22 are opened when the accelerator reaches the position 100 in the series motor connection, under the control of the accelerator switch Acc. N (in the circuit 125 of Fig. 1b), as indicated by suitable legends in Fig. 4b.

In the so-called "normal" method of manipulation of the control-equipment, the motors are not kept operating in the full-series connection after the closure of the full-series switch J', but the high-speed switch HS (Fig. 1b) is closed during the initial stages of the series motoring operation, so that the high-speed relay HSR is energized as soon as the JR-in interlock 116 closes. Since the auxiliary switch JR immediately energizes the full-series switch J', through the JR-in interlock 122, it will be noted that the energization of the high-speed relay HSR (assuming that the high-speed switch HS is closed) will be substantially simultaneous with the closure of the full-series switch J'.

In response to the closure of the full-series switch J', the HSR-in interlock 135 thereupon immediately and automatically energizes the initial parallel-motor-combination switches M2 and M22, thus establishing the normal bridge-transition connections which are shown in Fig. 5a. This transition-connection is thus established when the accelerator reaches its position 66, in which the full-series switch J' is closed by the accelerator interlock Acc. G in the circuit 112 of Fig. 1b. In the illustrated control-system, which uses an accelerator or resistance-tap moving-device Acc., the initial parallel-motor-combination switches M2 and M22 make connections to corresponding accelerator-positions 143, 144, respectively, which are further advanced along the accelerator-resistances than the positions 71, 72 at which the initial series-motor-combination switch S1 was closed. As shown in Fig. 5a, each of these initial parallel-motor-combination switches M2 and M22 makes a connection from its fixed resistor-tap to the other terminal of the power-supply, or to the free armature-terminal of the other motor-means, as will be seen from the connections 143—M2—AT4, and 144—M22—AT1.

As is typical of bridge-transition connections, there is thus a moment when both the series-motor switch J' and the two parallel-motor switches M2 and M22 are closed, which establishes a momentary transitional across-the-line connection which can be traced, in Fig. 5a, from AT1 through M22, 144, 19, R22, 21, J', 12, R11, 17, 143 and M2, to AT4. This momentary transitional connection across the supply-circuit thus draws a certain amount of current, the value of which is controlled by the amount of resistance which is included between the fixed parallel-connection tap-points 144, 143 and the respective movable-tap connections 19 and 17. As long as the resistance-taps 19 and 17 are not close to the accelerator-positions 144 and 143, there will be sufficient resistance, included in this momentary transitional line-connection, to limit the current which is carried by the full-series switch J' to a reasonable value which is easily interrupted by said switch. This condition is true if the high-speed switch HS of Fig. 1b is closed while the accelerator is in any of its positions 66 to 100, after which there begins to be such a small amount of resistance included between the fixed parallel-connection tap-points 144, 143 and the respective movable taps 19 and 17, as to impose a near short-circuit on the line, which could not possibly be tolerated. This is the reason why, in Fig. 4b, the transition-resistor bypassing-switches R11 and R22 are opened when the accelerator reaches its position 100 during the continued operation in the full-series connection.

Fig. 5a thus shows the first step of a normal bridge-transition, in which the closure of the parallel-connection switches M2 and M22 immediately deenergizes the series-connection switch J', at the M2-out interlock 123 and the M22-out interlock 104 in Fig. 1, thus completing the normal transition before the accelerator passes its position 100, as shown in Fig. 5b.

Fig. 6a shows what happens if the bridge-transition from series to parallel motoring is delayed (by keeping the high-speed switch HS open, in Fig. 1b), until the movable resistance-taps 17 and 19 are either exactly on the fixed parallel-connection tap-positions 143 and 144, respectively, or so close thereto as to approach a momentary transitional dead short-circuit across the line when all three of the motor-connection switches J', M2 and M22 are momentarily closed. This is the reason why it has not been feasible, heretofore, when using accelerators, or other advanceable and retractable multiposition switching-devices, to permit a bridge-transition to be made while the accelerator, or equivalent switching-device, is in an advanced position corresponding to the normal parallel-motor-combination operating-range, and at or close to a position in which substantially all of the accelerating resistances would be cut out during the parallel motoring connection.

Heretofore, it was necessary either to avoid the use of movable sequential switching-means altogether, or to delay the transition until the movable switching-device could be raced backwardly, at its top speed, until it reached a switching position in which the accelerating resistances were not going to be substantially short-circuited during the approaching parallel motoring operation. The time-delay which would be inherent in such a hasty retracting movement of the switching-device, while being only a small time-delay of perhaps a second or two, is nevertheless objectionable, and that is why I say that my transition-resistors R1 and R2 provide for a fast and safe means of using the bridge-transition in a control-system in which the resistor-notching device is either an accelerator (as shown), or a cam-controller, or other equivalent movable sequential multiposition switching-device. The fast operating-time is secured by avoiding the necessity for ever having to hastily change the position of the resistor-notching device; and a safe bridge-transition is provided by introducing the transition-resistors R1 and R2 which prevent a near line-short-circuit.

My transition-resistors R1 and R2 avoid two time-delays; not only the delay which would otherwise be entailed in racing the accelerator back, to prepare for transition to parallel motoring, as just described, but also the delay which would be required for repositioning the accelerator from a safe-transition position to a suitable braking-position, in the event that dynamic braking should be required immediately after a delayed transition.

Fig. 6a shows that when a bridge-transition from series to parallel motor-operation is made (by closing the high-speed switch HS in Fig. 1b) when the accelerator Acc. is in a position beyond its position 100, or other point which is beginning to be too close to the fixed parallel-connection points 143 and 144, the accelerator switch Acc. N will have already opened in the circuit 125 in Fig. 1b, and hence the transition-resistors R1 and R2 will have been already automatically introduced in the circuit-portion which contains the two accelerating resistances, so that no matter how much of the accelerating resistances may be cut out at the moment of transition, the transition-resistors R1 and R2 will have enough resistance to prevent the flow of a dangerous line-short-circuiting current.

In such a delayed bridge-transition, the series-connection-switch J' will be automatically opened, as before, as soon as the parallel-connection switches M2 and M22 are fully closed, as shown in Fig. 6b; and then the transition-resistor bypassing-switches R11 and R22 will be automatically reclosed, as shown in Fig. 6c, by the J'-out interlock 128 of Fig. 1b. Thus, the transition-resistors R1 and R2 are automatically cut out when the final series-motor combination switch J' is open or deenergized, at the same time when the M2-in interlock 129 is closed, which indicates that the initial parallel-motor-combination switches M2 and M22 are simultaneously energized or closed.

This delayed-transition operation will take place, not only when the accelerator is permitted to range forward into positions which it normally occupies during parallel motor operation, but while the motor-connections are still in the series motor combination; but also a delayed transition may occur after the transition to parallel motor operation has once been made, with the vehicle operating at an advanced speed in parallel motoring, if the power is then cut off, by returning the master controller to a power-off position: then if the power is subsequently reapplied to the motors, by moving the master controller back to a power-on position, the motor-connections may then be permitted to be sequentially changed, through all series motor connections, and then with a bridge-transition to the parallel motor connections, while the accelerator or other resistor-notching device is in any position at all, even a position in which a fast and safe transition could not be made without my transition-resistors R1 and R2.

It will thus be seen that I have accomplished my objects by a novel introduction of a transition-resistor means, in a particular place in the circuit-connections, and with very simple transition-resistor control-means, and at a very small cost. If, as shown, the transition-resistors R1 and R2 are left in a current-carrying circuit for only an extremely short transitional time, just long enough to get a contactor-switch open, it will be obvious that the transition-resistors do not need to have a continuous current-rating commensurate with the current that they momentarily handle, but they may have an extremely short current-time rating, which means a transition-resistor of very low cost, occupying very little space.

Fig. 7a shows the early stages of the parallel motoring connections when the master controller is in position Pwr. 1 or Pwr. 2, and when the accelerator is advancing, or has advanced, to anywhere between the accelerator position 66, at which the transition can first be made in response to the interlock Acc. G (in the circuit 112 of Fig. 1b), and the accelerator position 132, which is just before the accelerator interlock Acc. O closes (in the circuit 146 of Fig. 1b), to close the final parallel-connection switches M1 and M11 which are shown in the full-parallel connection of Fig. 7c. Except for the indicated range of accelerator positions, the parallel motoring connection of Fig. 7a is identical to the final delayed-transition connection of Fig. 6c.

Fig. 7b shows the condition taken by the parallel motoring connections when the master controller is on its position Pwr. 3 at any time when the accelerator is between its position 66, when transition can first be made, and its position 80, at which point the interlock Acc. J opens in the circuit 148 of Fig. 1b and makes this Pwr. 3 connection impossible. The Pwr. 3 connection consists in closing the parallel-motor-combination switches M3 and M33, in addition to the initial parallel-motor-combination switches M2 and M22. The M3 switch connects a resistance R3 between the variable-tap circuit 17 and the armature-terminal AT2, while the switch M33 connects a resistance R4 between the variable-tap circuit 19 and the armature-terminal AT1. These connections make the motor-acceleration smoother and quicker, when the motor is being accelerated, at a high rate of acceleration, with the master controller MC on its final power-position Pwr. 3.

Fig. 7c shows the full-parallel connection of the motors, which is obtained with the master controller on any one of its power positions Pwr. 1 to Pwr. 3 when the accelerator reaches its position 133, thus closing the interlock Acc. O in the circuit 145 of Fig. 1b, thereby energizing the final parallel-motor-combination switches M1 and M11, which respectively make a direct connection between the variable-tap circuit 17 and the armature-terminal AT4, and another direct connection between the variable-tap circuit 19 and the armature-terminal AT1. After this point has been reached, the accelerator continues to range forward, under the control of the limit-relay contact 46, with the pilot-motor connection as shown in Fig. 7c, continuing to adjust the positions of the rheostat-taps up to the full extent of the accelerator-resistances 1–174 and 2–174, or until the limit-switch Acc. U opens and stops the on-movement of the pilot motor PM. The accelerator resistances are not shown in Fig. 7c, because they are each connected to the motor-circuits at its respective variable-tap circuit 17 or 19, as the case may be, having no complete circuit-connection. Meanwhile, the accelerator is adjusting its resistor-positions so as to be in readiness for a changeover to a dynamic-braking connection. At the accelerator position 161, the filed-shunting switch F1 is closed in response to the accelerator interlock Acc. Q at 89—87 in Fig. 1b; and at the accelerator position 171 the second field-shunting switch F2 is closed in response to the accelerator interlock Acc. R at 95–98 in Fig. 1b; all as indicated by legends in Fig. 7c.

In the actual installation from which my simplified drawing was made, there were more accelerator positions than the 174 positions which are shown in the accompanying drawing, but the positions which are shown are sufficient to indicate that the accelerator is moved through as many adjustment-steps or positions as may be necessary or desirable, to effect a smooth acceleration of the motor, with as many field-shunting steps as may be desired, and at the same time to introduce as much resistance as may be necessary for the desired gentle dynamic braking when the master controller is moved to its Coast position while the motors are operating at their maximum speed.

Dynamic-braking connections are established by the closure of the three braking-switches B, B1 and B2, as shown in Fig. 8a, both during the coasting operation, when the master controller is on Coast, and during the braking operation, when the master controller is on any one of three brake-positions Brk. 1 to Brk. 3. During this time, the accelerator Acc. is ranging downwardly, or retracting, anywhere in the range from the topmost accelerator position 174 to brake-fadeout. During these braking or coasting conditions, the principal important difference between the four master-controller positions Coast, Brk. 1, Brk. 2 and Brk. 3 is in the setting or rating of the limit relay LR, which permits the backward or off-movement of the pilot motor PM, only when the motor-current is less than that which is called for by the limit relay LR, as controlled by the master-controller position and by the current-responsive energization of the rerate-coil LR–1 in Fig. 1a.

During this time, as shown in Fig. 8a, the pilot motor PM is being intermittently driven toward the off-position of the accelerator Acc., with the off-direction field-winding Off of the pilot motor connected in shunt across the armature-terminals of the pilot motor, until the accelerator begins to approach its position 15, at which time the interlock Acc. F closes in the circuit 62—63, say in position 31, thereby connecting the On coil in reverse direction in series with the pilot-motor armature, immediately followed, in position 29, by the opening of the interlock Acc. E, which removes a momentary short-circuit on the coil On. The reason for this introduction of the circuit-connection 62—63, in series with the pilot motor PM, is to introduce a limit-switch Acc. A (Fig. 8b), which is also included in said circuit-connection 62—63, as will be described in connection with Fig. 8b.

As shown in Fig. 8a, the second field-shunting switch F2 is closed, only when the high-speed relay HSR is de-energized, and when the accelerator Acc. is in its extreme topmost range of positions 174 to 170, when the interlock Acc. R is closed in the circuit 95—98 of Fig. 1b, as indicated by legend in Fig. 8a. The first field-shunting switch F1 is closed, when the HSR relay is deenergized, whenever the master controller MC is in its Coast position—(at which time the X1-in interlock 92 is closed in Fig. 1b, indicating that a very weak dynamic-braking current is desired). This field-shunting switch F1 is also closed in accelerator positions 174 to 160, (when the interlock Acc. Q is closed at 89—87 in Fig. 1b), whenever the master controller is on any of its brake positions Brk. 1 to Brk. 3, (when the B-in interlock 88 is closed in Fig. 1b). These conditions are indicated by legend in Fig. 8a, and the connections may be readily traced in Figs. 1a and 1b.

During the dynamic-braking conditions shown in Fig. 8a, with the accelerator Acc. ranging backwardly between positions 174 and the fadeout point, the transition-resistor bypassing-switches R11 and R12 are energized or held closed, by the B1-in interlock 130 of Fig. 1b. At some low position of the accelerator Acc., as when it moves from position 15 to position 14,, its interlock C opens, at 33—38 in Fig. 1a, thereby deenergizing the actuating-coils B1 and B2 of the braking switches B1 and B2, but these switches remain closed or actuated, because sufficient motor-current is then flowing through their series hold-in coils B1–1 and B2–1 to prevent these switches from immediately dropping out. The accelerator Acc. continues to range backwardly, therefore, under the control of the limit relay LR, until, at brake-fadeout, the braking current becomes too small to hold the braking switches B1 and B2 closed.

Fig. 8b shows the connections at motor-speeds below brake-fadeout, when the accelerator-positions are ranging downwardly from the fadeout point to position 1. The dynamic-braking circuits are interrupted by the opening of the braking switches B1 and B2 of Fig. 8a, in response to the substantial deenergization of their series hold-in coils B1–1 and B2–1, after which there is no longer a complete braking circuit, which is immaterial because the motor-speed is so low that the armature-voltages of the motors are insufficient to produce any sensible dynamic braking. The transition-resistors R1 and R2 are introduced in circuit by the opening of their bypassing switches R11 and R22 in response to the opening of the B1-in interlock 130 in Fig. 1b, this being done in order to prepare the way for the reclosure of these transition-resistor bypassing-switches R11 and R22 during the next power-application, in response to the LB-in interlock 124 and the accelerator interlock Acc. N, as will be evident from Fib. 1b. The first field-shunting switch F1 remains closed when the HSR relay is out and when the master controller MC is on Coast. This pilot motor continues to run off uninterruptedly, because the limit-relay contact 46 remains closed for lack of any motor-current to pick up this relay, until finally the off-movement of the pilot motor PM is interrupted by the opening of the limit-switch Acc. A.

Insofar as the energization of the actuating coils of the various relays and switches are concerned, these elements have been considered to be in their normal positions when they are deenergized, which is the position shown in Figs. 1a and 1b. Insofar as the functional performance of the various relays and switches is concerned, these elements are regarded as being in their normal positions when they are not responding to the quantity or condition to which they are considered as being responsive, in order to move from their normal positions to their responsive positions. Thus, for example, the limit-relay LR is designed to make a response, principally by closing its back-contact 46, when it fails to receive a sufficient energizing-voltage in its main operating-coil LR, which is to say, when the motor-current falls below a desired value corresponding to the pickup-value or setting of the relay. In other words, the limit-relay LN is responding to a predetermined drop in the motor-current, when the relay returns to its deenergized position.

While I have illustrated and described my invention in a single preferred and very much simplified form of embodiment, I wish it to be understood that equivalent or alternative elements may be substituted for those which I have illustrated, as I have pointed out in many places throughout the description; and it should also be understood that many additions or refinements would normally be used, in addition to those shown, in order to make up any completely competitive form of embodiment of my invention, but otherwise having nothing to do with an understanding of the novel features of the present invention. It should also be understood that some features which I have shown and described are not needed in some installations in which the operating requirements may be somewhat different.

I claim as my invention:

1. A motor-controlling assembly, comprising: (a) at least two motor-means, to be controlled; (b) a set of accelerating resistors for each motor-means; (c) a movable plural-contact sequential switching-device for controlling the effective values of said accelerating resistors, said sequential switching-device being of a type which moves in one direction during the power-operation acceleration of said motor-means in first a series motor-combination and then a bridge-type transition to a parallel motor-combination, and which moves in the other direction when the power-operation of said motor-means is discontinued; and (d) an advanced-speed control-means for providing for the operation of said motor-means at an advanced speed with power off, and for providing for a subsequent reapplication of power in a series motor-connection, followed by a bridge-type transition to a parallel motor-connection while the sequential switching-device is in any one of a plurailty of advanced positions, normally corresponding to parallel-motor-connection operation, and including a position in which said sequential switching-device cuts out substantially all of said accelerating resistors; said control-means comprising: (da) a final series-motor-connection switch which bypasses said accelerating resistors in the series motor-connection; (db) a transition-resistor in series with each of said bypassed accelerating resistors; (dc) a pair of initial parallel-motor-connection switches for completing the parallel connection of said motor-means in such manner as to provide a momentary transitional across-the-line connection which also includes said final series-motor-connection switch, said transition-resistors, and any active portions of said accelerating resistors; (dd) a means for opening said final series-motor-connection switch when said initial parallel-motor-connection switches are closed; and (de) a means for bypassing said transition-resistors when said final series-motor-connection switch is thus opened.

2. A railway-motor assembly, comprising: (a) at least two traction-motor means, to be controlled during both power-operation and dynamic-braking operation; (b) accelerating and braking resistors for said traction-motor means; (c) a movable plural-contact sequential switching-device for controlling the effective values of said accelerating and braking resistors during both the power-operation and the dynamic-braking operation of said traction-motor means, said sequential switching-device being of a type which moves in one direction during the power-operation acceleration of said traction-motor means in first a series motor-combination and then a bridge-type transition to a parallel motor-combination, and which moves in the other direction during the dynamic-braking operation of said traction-motor means; (d) a motor-control means, having an off position, a power position, and a brake position; (e) a power-operation control-means, responsive to the power position of the motor-control means, for controlling the power-operation of the traction-motor; (f) a dynamic-braking control-means, responsive to the off and brake positions of the motor-control means, for controlling the dynamic-braking operation when said traction-motor means are operating at a speed above brake-fadeout; (g) a limit-relay means, having an operating means which is energized to make said limit-relay means responsive to conditions which accompany a lower-than-desired motor-current during diverse power-operating and dynamic-braking conditions; (h) a power-energized advanceable operating-means, for advancing the sequential switching-device whenever said limit-relay responds, and subject also to a control by the power position of said motor-control means, in such manner that the accelerating and braking resistors are constantly maintained in a desired condition for power-operation and in a proper condition in readiness for dynamic braking at all motor-speeds during the power-operation of the traction-motor means; and (i) a power-energized retractable operating-means, for retracting said sequential switching-device whenever said limit-relay responds, and subject also to a control by the off and brake positions of said motor-control means, in such manner that the accelerating and braking resistors are constantly maintained in the desired condition for dynamic braking, at all motor-speeds above fadeout, during the braking operation of the traction-motor means; characterized by said power-operation control-means comprising: (ea) a final series-motor-connection switch which closes at a first intermediate position during the advance of said advanceable operating-means, and which thereupon bypasses the portions of said accelerating and braking resistors which were previously effective in the series motor-connection; (eb) a transition-resistor means included, in series-circuit relation, in the series-motor-combination circuit-portions in which the effective accelerating resistance is located; (ec) a transition-resistor bypassing-switch for at times bypassing said transition-resistor means; (ed) a pair of initial parallel-motor-connection switches for completing the parallel connection of said motor-means in such manner as to provide a momentary transitional across-the-line connection which also includes said series-motor-combination circuit-portions in which the effective accelerating resistance and the transition-resistor means are located; (ea) a means for opening said final series-motor-connection switch when said initial parallelmotor-connection switches are closed; and (ef) a plural-controlled transition-resistor switch-control means, for ensuring that said transition-resistor bypassing-switch is closed during a plurality of positions of said sequential switching-device, up to an advanced position which is in the normal parallel-combination part of the advance of said sequential switching-device, and which falls short of the position in which substantially all of the accelerating resistance is cut out, and for also ensuring that said transition-resistor bypassing-switch is closed when said final series-motor-connection switch is open and when said pair of initial parallel-motor-connection switches are simultaneously closed.

3. A motor-controlling assembly, comprising: (a) at least two motor-means, to be controlled; (b) a set of accelerating resistors for each motor-means; (c) a motor-energizing switching-means for connecting said motor-means first in a series motor-combination, and then in a bridge-type transition to a parallel motor-combination, said switching-means including a final series-combination switching-element and an initial parallel-combination switching-element which are momentarily both closed during the transition, so as to provide a momentary transitional across-the-line connection which includes the portions of the circuits in which the respective accelerating resistors are normally located; (d) a limit-relay means, having an operating means which is energized to make said limit-relay means responsive to conditions which accompany a lower-than-desired motor-current during diverse operating-conditions; (e) a motor-control means, having an off position and a power position, for controlling said motor-energizing switching-means; (f) a multiposition switching-device, for progressively controlling the effective values of said accelerating resistors during a continuous advancement of said multiposition switching-device, both in the series motor-combination and later on in the parallel motor-combination, during the accelerating control of said motor-means, said multiposition switching-device having a power-energized advanceable operating-means which operates under the control of both said limit-relay means and the power position of said motor-control means, and having a power-energized retractable operating-means which operates at least under the control of the off position of said motor-control means; (g) a transition-resistor in series with each set of accelerating resistors, connected in the same circuit-portion as the associated accelerating resistors so as to be included in the momentary across-the-line transitional connection; and (h) a plural-controlled transition-resistor switching-mechanism for bypassing each of the transition-resistors, said transition-resistor switching-mechanism having a first operating-means which is effective during a plurality of positions of the multiposition switching-device, up to an advanced position which is in the normal parallel-combination part of the advance of said multiposition switching-device, and which falls short of the position in which substantially all of the accelerating resistance is cut out, and said transition-resistor switching-mechanism having a second operating-means which is effective when said final series-combination switching-element is open and when said initial parallel-combination switching-element is simultaneously closed.

4. A railway-motor assembly, comprising: (a) at least two traction-motor means, to be controlled during both power-operation and dynamic-braking operation; (b) accelerating and braking resistors for said traction-motor means; (c) an advanceable and retractable multi-position switching-device, for progressively controlling the effective values of said accelerating and braking resistors; (d) a motor-connection switching-means, including power-connections and dynamic-braking connections, said power-connections operating said traction-motor means first in a series motor-combination, and then in a bridge-type transition to a parallel motor-combination, said power-connections including a final series-combination switch-ing-element and an initial parallel-combination switching-element which are momentarily both closed during the transition, so as to provide a momentary transitional across-the-line connection which includes a circuit-portion in which at least some of the aforesaid accelerating and braking resistors are normally located; (e) a master-controller means, having an off position, a plurality of power positions, and a plurality of brake positions, said power positions being operative to control said power-connections, and said off and brake positions being operative to control said dynamic-braking connections when said traction-motor means are operating at a speed above brake-fadeout; (f) a limit-relay means, having an operating means which is energized to make said limit-relay means responsive to conditions which accompany a lower-than-desired motor-current during diverse power-operating and dynamic-braking conditions, at diverse settings in accordance with the various positions of the master-controller means; (g) a power-energized advanceable operating-means, for advancing the multiposition switching-device in response to both said limit-relay means and power positions of the master-controller means in such manner that the accelerating and braking resistors are constantly maintained in a desired condition for power-operation and in a proper condition in readiness for dynamic braking at all motor-speeds during the power-operation of the traction-motor means; (h) a power-energized retractable operating-means, for retracting said multiposition switching-device in response to both said limit-relay means and said off and brake positions of the master-controller means in such manner that the accelerating and braking resistors are constantly maintained in the desired condition for dynamic braking, at all motor-speeds above fadeout, during the braking operation of the traction-motor means; (i) a transition-resistor means which is serially included in the same circuit-portion which is included in the momentary transitional across-the-line connection; and (j) a plural-controlled transition-resistor switching-mechanism for bypassing the transition-resistor means, said transition-resistor switching-mechanism having a first operating-means which is effective during a plurality of positions of the multiposition switching-device, up to an advanced position which is in the normal parallel-combination part of the advance of said multiposition switching-device, and which falls short of the position in which substantially all of the accelerating resistance is cut out, and said transition-resistor switching-mechanism having a second operating-means which is effective when said final series-combination switching-element is open and when said initial parallel-combination switching-element is simultaneously closed.

5. A motor-controlling assembly, comprising: (a) a first and a second motor-means, to be controlled; (b) a first and a second accelerating resistor, each having a variable-positioned tap-means; (c) an advanceable and retractable multiposition tap-changing device for progressively changing the positions of the tap-means on both of said accelerating resistors; (d) a first power-operation connection-means for connecting said first motor-means between a first power-supply terminal for the two motor-means and the tap-means of said first accelerating resistor, and a second power-operation connection-means for connecting the second motor-means between the second power-supply terminal for the two motor-means and the tap-means of the second accelerating resistor, at least one of said power-operation connection-means including a normally open line-switch; (e) an initial normally open series-motor-combination switch-connection between corresponding fixed points on the two accelerating resistors at a first intermediate position therealong; (f) a final normally open series-motor-combination switch-connection between the two motor-means terminals which are connected to the tap-means of the respective accelerating resistors; (g) a pair of initial normally open parallel-motor-combination switch-connections to corresponding fixed points on the respective accelerating resistors at a subsequent position therealong, each of said initial parallel-motor-combination switch-connections extending to the power-supply terminal associated with the other one of the two motor-means; (*h*) a master-controller means, having an off position and a plurality of power positions; (*i*) a limit-relay means, having an operating means which is energized to make said limit-relay means responsive to conditions which accompany a lower-than-desired motor-current during diverse operating-conditions, in accordance with the position of the master-controller means; (*j*) a means for closing said line-switch during the power positions of the master-controller means; (*k*) a power-energized advanceable operating-means, for advancing the tap-changing device in response to both said limit-relay means and one or more of the power positions of the master-controller means; (*l*) a means for closing the initial series-motor-combination switch-connection in response to one of the power positions of the master-controller means; (*m*) a means for closing the final series-motor-combination switch-connection, jointly in response to a tap-position which is close to, and not substantially further advanced than, said first intermediate position along said accelerating resistors, and in response to an open condition of the pair of initial parallel-motor-combination switch-connections; (*n*) a means for subsequently closing said pair of initial parallel-motor-combination switch-connections during the power-operation of said motor-means; (*o*) a transition-resistor which is serially included in each of the circuit-portions which includes one of the accelerating resistors; (*p*) a plural-controlled transition-resistor switching-mechanism for bypassing each of the transition-resistors, said transition-resistor switching-mechanism having a first operating-means which is effective during a plurality of tap-positions up to a point which is beyond said first intermediate position along said accelerating resistors, and which falls short of the fixed points at which the initial parallel-motor-combination switch-connections are made, and said transition-resistor switching-mechanism having a second operating-means which is effective when said final series-motor-combination switch-connection is open and when said initial parallel-motor-combination switch-connections are simultaneously closed; and (*q*) a power-energized retractable operating-means, for retracting the tap-changing device, at least in response to the off position of the master-controller means.

6. A railway-motor assembly, comprising: (*a*) a first and a second traction-motor means, to be controlled during both power-operation and dynamic braking, each traction-motor means comprising an armature-circuit-portion and a serially connected field-circuit-portion; (*b*) a first and a second transition-resistor; (*c*) a first accelerating and braking resistor and a second accelerating and braking resistor, each having a variable-positioned tap-means; (*d*) an advanceable and retractable multiposition tap-changing device for progressively changing the positions of the tap-means on both of said accelerating and braking resistors; (*e*) a connection-means for connecting each transition-resistor between the tap-means of the corresponding accelerating and braking resistor and the free field-circuit terminal of the corresponding traction-motor means; (*f*) a first power-operation connection-means for connecting the free armature-circuit terminal of the first traction-motor means to a first power-supply terminal for the two traction-motor means, and a second power-operation connection-means for connecting the free armature-circuit terminal of the second traction-motor means to the second power-supply terminal for the two traction-motor means, at least one of said power-operation connection-means including a normally open line-switch; (*g*) an initial normally open series-motor-combination switch-connection between corresponding fixed points on the two accelerating and braking resistors at a first intermediate position therealong; (*h*) a final normally open series-motor-combination switch-connection between the free field-circuit terminals of the two traction-motor means; (*i*) a pair of initial normally open parallel-motor-combination switch-connections to corresponding fixed points on the respective accelerating and braking resistors at a subsequent intermediate position therealong, each of said initial parallel-motor-combination switch-connections extending to the power-supply terminal associated with the free armature-circuit terminal of the other traction-motor means; (*j*) a plurality of normally open dynamic-braking switch-connections, including a switch-connection between the connection-points between the armature and field circuit-portions of the two traction-motor means, and a switch-connection between the starting end of each accelerating and braking resistor and the free armature-circuit terminal of the other traction-motor means; (*k*) a master-controller means, having an off position, a plurality of power positions, and a plurality of brake positions; (*l*) a limit-relay means, having an operating means which is energized to make said limit-relay means responsive to conditions which accompany a lower-than-desired motor-current during diverse power-operating and dynamic-braking conditions, at diverse settings in accordance with the various positions of the master-controller means; (*m*) a means for closing said line-switch during the power positions of the master controller means; (*n*) a power-energized advanceable operating-means, for advancing the tap-changing device in response to both said limit-relay means and the power positions of the master-controller means in such manner that the accelerating and braking resistors are constantly maintained in a desired condition for power-operation and in a proper condition in readiness for dynamic braking at all motor-speeds during the power-operation of the traction-motor means; (*o*) a means for closing the initial series-motor-combination switch-connection in response to one of the power positions of the master-controller means; (*p*) a means for closing the final series-motor-combination switch-connection, jointly in response to a tap-position which is close to, and not substantially further advanced than, said first intermediate position along said accelerating and braking resistors, and in response to an open condition of the pair of initial parallel-motor-combination switch-connections; (*q*) a means for subsequently closing said pair of initial parallel-motor-combination switch-connections during the power-operation of said motor-means; (*r*) a plural-controlled transition-resistor switching-mechanism for bypassing each of the transition-resistors, said transition-resistor switching-mechanism having a first operating-means which is effective during a plurality of tap-positions up to a point which is beyond said first intermediate position along said accelerating resistors, and which falls short of the fixed points at which the initial parallel-motor-combination switch-connections are made, and said transition-resistor switching-mechanism having a second operating-means which is effective when said final series-motor-combination switch-connection is open and when said initial parallel-motor-combination switch-connections are simultaneously closed; (*s*) a means for closing said dynamic-braking switch-connections during the brake positions of the master-controller means; and (*t*) a power-energized retractable operating-means, for retracting the tap-changing device in response to both said limit-relay means and said off and brake positions of the master-controller means in such manner that the accelerating and braking resistors are constantly maintained in the desired condition for dynamic braking, at all motor-speeds above fadeout, during the braking operation of the traction-motor means.

No references cited.